United States Patent [19]
Coates et al.

[11] Patent Number: 6,133,402
[45] Date of Patent: Oct. 17, 2000

[54] POLYCARBONATES MADE USING HIGH ACTIVITY CATALYSTS

[75] Inventors: Geoffrey W. Coates; Ming Cheng, both of Ithaca, N.Y.

[73] Assignee: Cornell Research Foundation, Inc., Ithaca, N.Y.

[21] Appl. No.: 09/328,441

[22] Filed: Jun. 9, 1999

Related U.S. Application Data

[60] Provisional application No. 60/095,247, Aug. 4, 1998.

[51] Int. Cl.$^7$ ................................................... C08G 63/02
[52] U.S. Cl. ............................................ 528/196; 528/296
[58] Field of Search ..................................... 528/196, 296

[56] References Cited

U.S. PATENT DOCUMENTS

| | | | |
|---|---|---|---|
| 2,686,796 | 8/1954 | Gmitter | 554/202 |
| 3,585,168 | 6/1971 | Inoue et al. | 528/371 |
| 3,699,079 | 10/1972 | Haynes | 528/92 |
| 3,706,713 | 12/1972 | Hull et al. | 528/413 |
| 3,900,424 | 8/1975 | Inoue et al. | 502/156 |
| 3,953,383 | 4/1976 | Inoue et al. | 528/413 |
| 4,783,445 | 11/1988 | Sun | 502/170 |
| 4,826,887 | 5/1989 | Kuyper et al. | 521/189 |
| 4,826,952 | 5/1989 | Kuyper et al. | 528/405 |
| 4,826,953 | 5/1989 | Kuyper et al. | 528/405 |
| 4,960,862 | 10/1990 | Carroll et al. | 528/405 |
| 4,981,948 | 1/1991 | Kawachi et al. | 528/405 |
| 5,026,676 | 6/1991 | Motika et al. | 502/170 |

OTHER PUBLICATIONS

Darensbourg, D. J., et al., Macromolecules, 28, 7577–7579 (1995).
Darensbourg, D. J. et al., Macomolecules 32, 2137–2140 (1999).
Cheng, M., et al., J. Am. Chem. Soc. 120, 11018–11019 (1998).
Cheng, M., et al., Polymeric Materials Science and Engineering 80, 44 (1999).
Super, M., et al., Macromolecules, 30, 368–372 (1997).
Darensbourg, D. J., J. Am. Chem. Soc. 121, 107–116 (1999).
Cheng, M., et al., Polymer Preprints 40(1), 542–543 (1999).
Coates, G. W., "New Strategies for the Synthesis of Stereoregular Polymers", prints of overheads from oral presentation at Polymer Outreach Program at Cornell University, Ithaca, New York, May 19, 1998.
Inoue, A., et al., J. Poly. Sci. Lett. vol. B7, pp. 287–292 (1996).
Aida, T., et al., J. Am. Chem. Soc. vol. 105, pp. 1304–1309 (1983).

*Primary Examiner*—Terressa M. Boykin

[57] ABSTRACT

Polycarbonates having $M_n$ ranging from about 5,000 to about 40,000 and a molecular weight distribution ranging from 1.05 to 2.0 are prepared from epoxides and $CO_2$ using a catalyst which has a Zn center and two ligands where one of the ligands is a propagating group and the other of the ligands is not a propagating group and an activity of at least one turnover per hour, preferably at least 100 turnovers per hour. Preferred catalysts have a

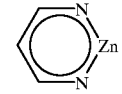

moiety with group on each nitrogen containing a phenyl moiety.

32 Claims, No Drawings

POLYCARBONATES MADE USING HIGH ACTIVITY CATALYSTS

CROSS-REFERENCE TO RELATED APPLICATION

This application claims the benefit of U.S. Provisional Application No. 60/095,247, filed Aug. 4, 1998.

TECHNICAL FIELD

The invention is directed at novel high activity zinc containing catalysts for producing polycarbonates from epoxide and carbon dioxide, to a process for producing polycarbonates using the catalysts and to the polycarbonates produced thereby.

BACKGROUND OF THE INVENTION

Polycarbonates are useful, for example, for packaging materials and coatings and are of special interest because they are biodegradable.

Consideration has been given to a phosgene-free synthesis of polycarbonates using epoxides and carbon dioxide monomers and various catalysts, in most instances zinc-containing catalysts.

Inoue, S., et al., J. Poly. Sci. Lett. B7, 287–292 (1969) discloses use of a poorly defined heterogenous catalyst made by partially hydrolyzing diethyl zinc. The catalyst has a very low activity requiring days for polycarbonate production.

Aida, T., et al., J. Am. Chem. Soc. 105, 1304–1309 (1983) teaches an aluminum porphyrin catalyst which has very low activity (<0.3 turnovers/hr).

Darenbourg, D. J., et al., Macromolecules, 28, 7577–7579 (1995) teaches a catalyst having the structure

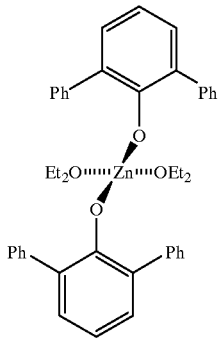

This catalyst provides higher activity (2.4 turnovers per hour) than previously described but said activity is still too low for a commercially competitive product. In the case of this catalyst, the ligands become part of the polymer chain end.

Super, M., et al., Macromolecules, 30, 368–372 (1997) discloses an ill defined catalyst made by reacting zinc oxide and

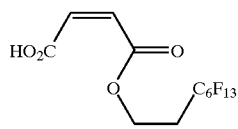

This catalyst provided an activity of 8.4 turnovers per hour, which is higher than achieved before but which still is quite low. Moreover, it requires running the polymerization in supercritical $CO_2$. In the case of this catalyst, the ligands become part of the chain end.

Moreover, conventional zinc (II) dicarboxylates and dialkoxides exhibit low activities and presumably lose their initial ligands during the polymerization reaction.

The catalysts heretofore exhibit polymerization rates that are far too low for an efficient industrial process. The polycarbonates made from epoxide and carbon dioxide up to now have not made much commercial impact because they are expensive due to time-consuming preparation because of the low activity of known catalysts.

Due to the inexpensive and accessible monomers used in the process (epoxides from olefins and $O_2$, $CO_2$) and the attractive properties and potential of polycarbonates, the development of a new, category of catalysts for this polymerization process is a significant scientific goal.

SUMMARY OF THE INVENTION

It has been discovered herein that catalysts competitive with and in many cases at least 10 times faster than catalysts heretofore known for catalyzing the reaction of epoxide and $CO_2$ to form polycarbonate have a zinc center and two ligands where one of the ligands is a propagating group and the other of the ligands is not a propagating group. These catalysts have an activity of at least one turnover per hour and preferred catalysts have an activity of at least 100 turnovers per hour, for catalyzing the reaction of epoxide and $CO_2$ to form polycarbonate.

In one embodiment of the invention herein, there is provided a catalyst for use in a method of polymerizing epoxide and carbon dioxide to produce polycarbonate where the catalyst has a zinc center and two ligands where one of the ligands does not become part of the polymer chain.

One group of catalysts herein have the formula

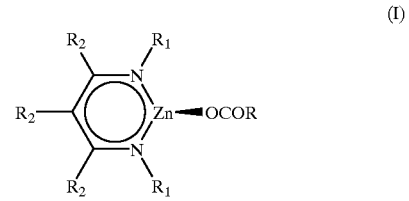

where each $R_1$ is selected from the group consisting of $C_1$–$C_{20}$ alkyl where one or more hydrogens is optionally replaced by halogen, e.g., chlorine or fluorine, and $C_6$–$C_{20}$ aryl where one or more hydrogens is optionally replaced by halogen, e.g., chlorine or fluorine, and where the $C_6$–$C_{20}$ includes the carbon atoms in aryl ring and carbon atom(s) in substituent(s) on aryl ring and each $R_1$ is the same or different, and each $R_2$ is selected from the group consisting of hydrogen, cyano, $C_1$–$C_{20}$ alkyl where one or more hydrogens is optionally replaced by halogen, e.g., chlorine or fluorine, and $C_6$–$C_{20}$ aryl where one or more hydrogens is optionally replaced by halogen, e.g., chlorine or fluorine, and where the $C_6$–$C_{20}$ includes the carbon atoms in aryl ring and carbon in atom(s) in substituent(s) on aryl ring and each $R_2$ is the same or different, and R is selected from the group consisting of $C_1$–$C_{20}$ allyl, $C_6$–$C_{20}$ aryl where the $C_6$–$C_{20}$ includes the carbon atoms in aryl ring and carbon atom(s) in substituent(s) on aryl ring and polymer of weight average molecular weight up to 1,000,000 having at least one pendant carboxyl group, or dimer thereof, the compound of formula (I) or dimer thereof being effective to catalyze the reaction of epoxide and $CO_2$ to form polycarbonate.

Another group of catalysts herein have the formula

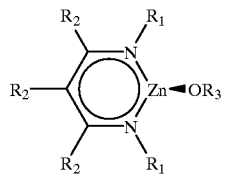

(II)

where each $R_1$ is defined the same as for (I) and each $R_1$ is the same or different and each $R_2$ is defined the same as for (I) and each $R_2$ is the same or different and $R_3$ is selected from the group consisting of hydrogen, $C_1$–$C_{20}$ alkyl, $C_6$–$C_{20}$ aryl where the $C_6$–$C_{20}$ includes the carbon atoms in aryl ring and carbon atom(s) in substituent(s) on aryl ring and polymer of weight average molecular weight up to 1,000,000 having at least one pendant hydroxyl group, or dimer thereof, the compound of formula (II) or dimer thereof being effective to catalyze the reaction of epoxde and $CO_2$ to form polycarbonate.

Another embodiment herein is directed to a method of preparing a polycarbonate, said method comprising copolymerizing monomers comprising carbon dioxide and epoxide selected from the group consisting of $C_2$–$C_{20}$ alkylene oxides, $C_4$–$C_{12}$ cycloalkene oxides and styrene oxide in the presence of a catalyst which has a Zn center and two ligands where one of the ligands is a propagating group and the other of the ligands is not a propagating group and an activity of at least one turnover per hour, often an activity of at least 100 turnovers per hour. Exemplary of the catalysts are those defined above in conjunction with formulas (I) and (II) and dimers thereof.

Another embodiment herein is directed to polycarbonate having an $M_n$ ranging from about 5,000 to about 40,000 and a molecular weight distribution (i.e., $M_w/M_n$) ranging from 1.05 to 2.0, e.g., from 1.05 to 1.25.

As used herein, the term "propagating group" means the group bound to the zinc center into which the monomers insert. In the case of catalysts (I) and (II), the ligands which are propagating groups are respectively —OCOR and —$OR_3$.

The term "turnovers per hour," sometimes abbreviated "TO/hr," means the number of moles of epoxide monomer per mole of zinc center polymerized per hour. The turnovers per hour may be referred to as "TOF" which stands for turnover frequency. The turnover number or TON is the turnover frequency multiplied by the time of reaction.

The $M_n$ referred to above is the number average molecular weight and is determined by gel permeation chromatography, versus monodispersed polystyrene standards.

The molecular weight distribution is $M_w/M_n$ (i.e., weight average molecular weight divided by number average molecular weight) and is determined by gel permeation chromatography.

DETAILED DESCRIPTION

As indicated above, the catalysts here have an activity of at least one turnover per hour and preferably at least 100 turnovers per hour. The catalysts have an activity, for example, ranging from 100 to 750 turnovers per hour or ranging from about 200 to 600 turnovers per hour.

We turn now to the catalysts having the formula (I) described above.

When R is a polymer having at least one pendant carboxyl group, it normally has a weight average molecular weight of at least 1,000 and preferably is either polyethylene oxide with at least one pendant carboxyl group or polybutadiene with at least one pendant carboxyl group.

One group of preferred catalysts contains a phenyl moiety in $R_1$ of formula (I).

One class of catalysts herein having the formula (I) and containing a phenyl moiety in $R_1$ of formula (I) have the formula

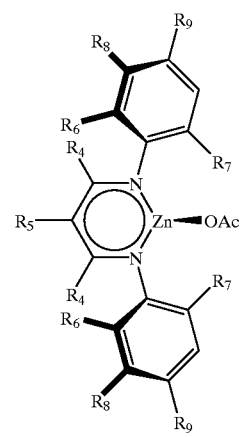

(V)

where $R_4$ is methyl, $R_5$ is hydrogen or cyano, $R_6$ and $R_7$ are the same or different and are $C_1$–$C_3$ alkyl, $R_8$ is hydrogen and $R_9$ is hydrogen, and OAc is acetate, or is dimer thereof.

The compounds of formula (V) normally exist in both monomeric and dimeric form in solution and in the dimeric form in the solid state.

One catalyst of formula (V) is the compound having the formula

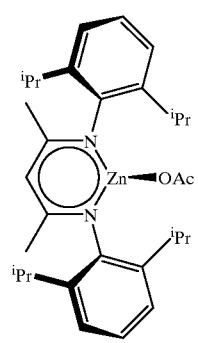

(III)

where $^iPr$ is isopropyl and OAc is acetate and is the compound of formula (V) where $R_4$ is methyl, $R_5$ is hydrogen, $R_6$ is isopropyl, $R_7$ is isopropyl, $R_8$ is hydrogen, and $R_9$ is hydrogen. This catalyst is referred to as Catalyst A hereinafter. A variation on this catalyst has the structure (III) except that one or both of the outer $R_2$ groups in formula (I) is triluoromethyl instead of methyl.

Another catalyst of formula (V) is the compound having the formula

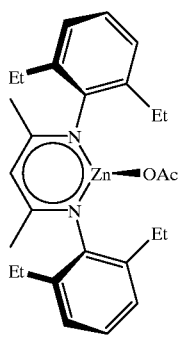

(VI)

where Et is ethyl and OAc is acetate, and is the compound of formula (V) where $R_4$ is methyl, $R_5$ is hydrogen, $R_6$ is ethyl, $R_7$ is ethyl, $R_8$ is hydrogen, and $R_9$ is hydrogen. This catalyst is referred to as Catalyst B hereinafter.

Catalysts of formula (I) and the catalysts of formula (V) can be prepared in a process characterized by ease of execution wherein two equivalents of $C_1$–$C_{20}$ primary amine are refluxed with 2,4-pentane dione (unsubstituted or substituted at the one, three and/or five positions) in acidic ethanol and deprotonating the resulting β-diimine at 0° C. with butyllithium (BuLi) and then reacting with zinc salt of aliphatic or aromatic acid corresponding to R and purifying the resulting complex. The primary amine determines $R_1$ and the dione determines each $R_2$.

The β-diimine has the formula (IX)

where $R_4$, $R_5$, $R_6$, $R_7$, $R_8$, and $R_9$ become $R_4$, $R_5$, $R_6$, $R_7$, $R_8$, and $R_9$ in the catalysts having corresponding formulas where that the ring hydrogen is converted to >ZnOCOR in the case of compounds of formula (V) and to >ZnOR$_3$ in the case of compounds of formula (VII) discussed below.

The compound of the formula (III) is readily prepared by refluxing two equivalents of 2,6-diisopropyl aniline with 2,4-pentane dione as described in Feldman, J., et al., Organometallics, 16, 1514–1516 (1997), hereinafter Feldman, which is incorporated herein by reference, and reacting the resulting β-diimine with one equivalent of butyllithium and one equivalent of zinc acetate at 0° C. in tetrahydrofuran and purifying by crystallizing from methylene chloride. For a variation where one or two of the $R_2$ groups is trifluoromethyl, the diones are 1,1,1-trifluoro-2,4-pentane dione and 1,1,1,5,5,5-hexafluoro-2,4-pentane dione respectively.

The compound of the formula (VI) can be prepared the same way as just described for the compound of the formula (III) except that 2,6-diethyl aniline is used in place of 2,6-diisopropyl aniline.

We turn now to the catalysts having the formula (II) described above.

When $R_3$ is a polymer having at least one pendant hydroxyl group, it normally has a weight average molecular weight of at least 1,000 and preferably is either polyethylene oxide with at least one pendant hydroxyl group or polybutadiene with at least one pendant hydroxyl group.

One group of preferred catalysts contains a phenyl moiety in $R_1$ of formula (II).

One class of catalysts herein having the formula (II) and containing a phenyl moiety in $R_1$ of formula (II) have the formula (VII)

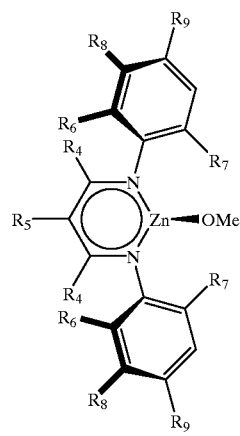

wherein $R_4$ is methyl, $R_5$ is hydrogen or cyano, $R_6$ and $R_7$ are the same or different and are $C_1$–$C_3$ alkyl, $R_8$ is hydrogen or chloro, and $R_9$ is hydrogen and Me is methyl, or is dimer thereof.

The compounds of formula (VII) normally exist mostly in the monomeric form and some in the dimeric form in solution and in the dimeric form in the solid state.

One catalyst of formula (VII) is compound having the formula (IV)

where $^i$Pr is isopropyl and Me is methyl and is the compound of formula (VII) where $R_4$ is methyl, $R_5$ is hydrogen, $R_6$ is isopropyl, $R_7$ is isopropyl, $R_8$ is hydrogen, and $R_9$ is hydrogen. This compound is considered to exist as the dimer in the solid state. This compound is referred to as Catalyst C hereinafter. A variation on this catalyst has the structure (IV) except that one or both of the outer $R_2$ groups in formula (II) is trifluoromethyl instead of methyl.

Another catalyst of formula (VII) is compound having the formula

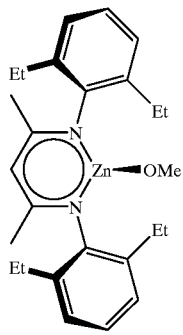

(VIII)

where Et is ethyl and Me is methyl and is the compound of formula (VII) where $R_4$ is methyl, $R_5$ is hydrogen, $R_6$ is ethyl, $R_7$ is ethyl, $R_8$ is hydrogen, and $R_9$ is hydrogen. This compound exists as the dimer in the solid state. This compound is referred to as Catalyst D hereinafter. A structure for the dimer is set forth below.

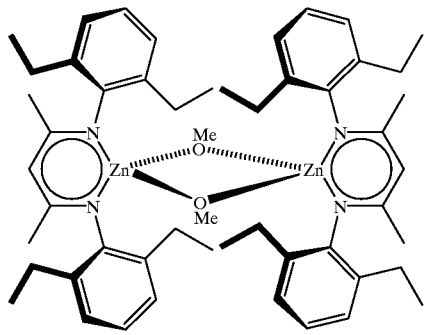

(X)

Still another catalyst of formula (VII) is compound having the formula (VII) wherein $R_4$ is methyl, $R_5$ is hydrogen, $R_6$ is isopropyl, $R_7$ is methyl, $R_8$ is hydrogen, and $R_9$ is hydrogen. This compound exists as the dimer in the solid state. This compound is referred to as Catalyst E hereinafter.

Still another catalyst of formula (VII) is compound having the formula (VII) wherein $R_4$ is methyl, $R_5$ is hydrogen, $R_6$ is isopropyl, $R_7$ is ethyl, $R_8$ is hydrogen, and $R_9$ is hydrogen. This compound exists as the dimer in the solid state. This compound is referred to as Catalyst F hereinafter.

Still another catalyst of formula (VII) is compound having the formula (VII) wherein $R_4$ is methyl, $R_5$ is hydrogen, $R_6$ is ethyl, $R_7$ is ethyl, $R_8$ is chloro, and $R_9$ is hydrogen. This compound exists as the dimer in the solid state. This compound is referred to as Catalyst G hereinafter.

Yet another catalyst of formula (VII) is compound having the formula (VII) wherein $R_4$ is methyl, $R_5$ is cyano, $R_6$ is ethyl, $R_7$ is ethyl, $R_8$ is hydrogen, and $R_9$ is hydrogen. This compound exists as dimer in the solid state. This compound is referred to as Catalyst H hereinafter.

Catalysts of formula (II) and the catalysts of formula (VII) can be prepared in a process characterized by ease of execution where β-diimine prepared as described in conjunction with preparation of compounds of the formula (V) is reacted with two equivalents of diethyl zinc at 0° C. One of the equivalents of diethyl zinc reacts and the other is removed. The resulting product is reacted with one equivalent of $R_3OH$ to replace the ethyl on the reacted zinc atom with $OR_3$, thereby to form catalysts of formula (II) and the catalysts of formula (VII).

The compound of the formula (IV) can be prepared by reacting the β-diimine used for producing compound of formula (III), with two equivalents of diethyl zinc in toluene at 0° C. and removing unreacted diethyl zinc and solvent in vacuo and then reacting with methanol.

The compound of formula (VIII) can be prepared in the same way as the compound of formula (IV) except that the β-diimine is the same as that used for preparation of compound of formula (VI).

The compound of Catalyst E can be prepared in the same way as the compound of formula (IV) except that the β-diimine is prepared by refluxing two equivalents of 2-isopropyl-6-methyl aniline with 2,4-pentane dione by the method described in Feldman.

The compound of Catalyst F can be prepared in the same way as the compound of formula (IV) except that the β-diimine is prepared by refluxing two equivalents of 2-ethyl-6-isopropyl aniline with 2,4-pentane dione by the method described in Feldman.

The compound of Catalyst G can be prepared in the same way as the compound of formula (IV) except that the β-diimine is prepared by refluxing two equivalents of 2,6-diethyl-3-chloro aniline with 2,4-pentane dione by the method described in Feldman.

The compound of Catalyst H can be prepared in the same way as the compound of formula (IV) except that the β-diimine is prepared by reacting β-diimine the same as used for preparing compound of the formula (VI), with 1 equivalent of n-butyllithium at −78° C. in tetrahydrofuran (THF), followed by stirring with 1 equivalent of p-toluenesulfonyl cyanide at −78° C. for two hours, then warming to room temperature, then removing solvent in vacuo, and then isolating the product by extracting the solid residue with methylene chloride, washing with water and drying in vacuo.

We turn now to the embodiment herein directed to a method of preparing a polycarbonate, said method comprising copolymerizing monomers comprising carbon dioxide and epoxide selected from the group consisting of $C_2$ to $C_{20}$ alkylene oxides, $C_4$ to $C_{12}$ cycloalkene oxides and styrene oxide in the presence of a catalyst which has a Zn center and two ligands where one of the ligands is a propagating group and the other of the two ligands is not a propagating group and an activity of at least one turnover/hour, often an activity of at least 100 turnovers per hour, where examples of the catalysts are those defined above in conjunction with formulas (I) and (II), or dimers thereof, and examples of preferred catalysts are those described above in conjunction with formulas (V) and (VII), and examples of very preferred catalysts are Catalysts A, B, C, D, E, F, G, and H.

Examples of alkylene oxides include ethylene oxide, propylene oxide, and oxabicycloheptane.

Examples of cycloalkene oxides include cyclopentene oxide, cyclohexene oxide, cyclooctene oxide, and vinylcyclohexene diepoxide (which results in clear cross-linked polycarbonate). Cyclohexene oxide, i.e., 1,2-epoxycyclohexane, is normally taken as a benchmark in the art for comparing activity of catalysts and determining efficiency of a polycarbonate preparation process.

The mole ratio of catalyst to epoxide normally should range from 1:100 to 1:4000, e.g., from 1:100 to 1:1500, with 1:1000 being preferred.

The temperature at which reaction is carried out normally ranges from 20° C. to 110° C. with 50° C. being preferred.

The reaction can be carried out at a pressure (caused by $CO_2$) ranging from 20 psi to 800 psi, preferably from 20 psi to 500 psi, e.g., 100 psi.

The reaction can be carried out, for example, over a period of 1 to about 24 hours, preferably 1½ to 6 hours, e.g., 2 hours.

The reaction is normally carried out with the epoxide monomer functioning as the reaction solvent, i.e., without other reaction solvent being present. The catalysts thus function in solution and are considered to function in the monomeric form and in the dimeric form in solution.

We turn now to the embodiment herein directed to polycarbonate having a $M_n$ ranging from about 5,000 to about 40,000 and a molecular weight distribution ranging from 1.05 to 2.0, e.g., 1.05 to 1.25. The molecular weight distribution range means that the product is very homogeneous. The product typically has 85% or more carbonate linkages, often 95% or more carbonate linages. A product obtained by copolymerizing cyclohexene oxide and carbon dioxide is poly(cyclohexenylene carbonate) and comprises

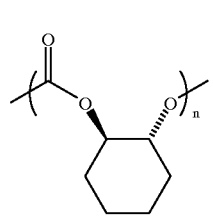

(XI)

where n ranges from 50 to 500 and contains at least 85%, often at least 95% polycarbonate linkages. The product is biodegradable and is suitable for packaging material and for coatings.

The invention is illustrated by the following specific examples:

EXAMPLE I

Catalyst A

To a solution of β-diimine formed from 2,4-pentane dione and two equivalents of 2,6-diisopropyl aniline as described in Feldman, J., et al. Organometallics, 16, 1514–1516 (1997), hereinafter H(BDI)-1, (0.535 g, 1.28 mmol) in tetrahydrofuran, denoted THF hereinafter (10 ml) was slowly added n-BuLi (1.6M in hexane, 0.88 ml, 1.41 mmol) at 0° C. After stirring for 5 min at 0° C., the solution was cannulated to a solution of zinc acetate (0.240 g, 1.41 mmol) in THF (15 ml). After stirring overnight at room temperature, the suspension was filtered over a frit and the clear solution was dried in vacuo. The light yellow solid was recrystallized from a minimum amount of methylene chloride at –20° C. to produce compound of formula (III), i.e., Catalyst A (0.436 g, 63% yield). $^1$H NMR (25 mg complex in 0.55 ml $C_6D_6$, 300 MHz, "M" denotes monomer, "D" denotes dimer) δ7.11 (18H, M+D, m, ArH), 4.93 (1H, s, β-CH, m), 4.64 (2H, s, β-CH, D), 3.29 (12H, m, $CHMe_2$, M+D), 1.73 (6H, s, OC(O)Me, D), 1.67 (6H, s, α-Me, M), 1.55 (12 H, s, α-Me, D), 1.41 (12H, d, J=6.4 Hz, CHMeMe', M), 1.31 (3H, s, OC(O)Me, M), 1.19 (24H, d, J=7.0 Hz, CHMeMe', D), 1.14 (24H,d,J=7.0 Hz, CHMeMe', D), 0.87 (12H, d, J=6.4 Hz, CHMe,Me', M). X-ray diffraction data: monoclinic, $P2_1/n$, colorless; α=13.0558(3) Å, b=15.1725 (4) Å, c=15.9712(2) Å; β=106.142(1); V=3038.99(11); Z=4; R=0.535; GOF=1.121. Analysis of the compound by X-ray crystallography revealed the compound exists as the dimer in the solid state.

EXAMPLE II

Catalyst B

To a solution of β-diimine formed from 2,4-pentane dione and two equivalents of 2,6-diethyl aniline as described in Feldman for H(BDI)-1 (hereinafter H(BDI)-2) (0.501 g, 1.38 mmol) in THF (10 ml) was slowly added n-BuLi (1.6M in hexanes, 0.95 ml, 1.52 mmol) at 0° C. After stirring for 5 min at 0° C., the solution was cannulated to a suspension of zinc acetate (0.266 g, 1.45 mmol) in THF (15 ml). After stirring overnight at room temperature the suspension was filtered over a frit and the clear solution was dried in vacuo. The crude material was dissolved in 20 ml toluene; the insoluble precipitate was filtered over a frit. The clear solution was concentrated and then recrystallized at –30° C. (0.323 g, 48%) to provide compound of formula (VI), i.e., Catalyst B. Analysis of the compound by X-ray crystallography revealed the compound exists as the dimer in the solid state.

EXAMPLE III

Catalyst C

To a solution of diethyl zinc (0.61 ml, 5.95 mmol) in toluene (10 ml) was slowly added H(BDI)-1 produced as in Example I (0.501 g. 1.196 mmol) in toluene (10 ml) at 0° C. After stirring overnight at 80° C., the clear solution was dried in vacuo, giving a quantitative yield (0.61 g) of intermediate (BDI-1)ZnEt. $^1$H NMR ($C_6D_6$, 300 MHz) δ7.07 (6H, m, ArH), 4.98 (1H, s, β-CH), 3.18 (4H, m, $CHMe_2$), 1.69 (6H, s, α-Me), 1.25 (12H, d, J=7.0 Hz, CHMeMe'), 1.14 (12H, d, J=7.0 Hz, CHMeMe'), 0.89 (3H, t, J=8.0 Hz, $CH_2CH_3$), 0.24 (2H, q, J=8.0 Hz, $CH_2CH_3$). To a solution of (BDI)ZnEt-1 (1.196 mmol) in toluene (10 ml) was added methanol (0.24 ml, 5.91 mmol) at room temperature (RT). After stirring for an hour at room temperature, the clear solution was dried in vacuo to produce compound of formula (IV), i.e., Catalyst C (0.604 g), 98% yield. $^1$H NMR ($C_6D_6$, 300 MHz) δ7.13 (6H, m, ArH), 4.87 (1H, s, β- CH), 3.30 (3H, s, $OCH_3$), 2.97 (4H, m, $CHMe_2$), 1.53 (6H, s, α-Me), 1.20 (12H, d, J=6.5 Hz, CHMeMe'), 1.16 (12H, d, J=6.5 Hz, CHMeMe'). Analysis of the compound by X-ray crystallography revealed the compound exists as the dimer in the solid state.

EXAMPLE IV

Catalyst D

To a solution of diethyl zinc (0.61 ml, 5.95 mmol, 2 eq) in toluene (5 ml) was slowly added H(BDI)-2 produced as in Exanmple II (1.077 g, 2.971 mmol, 1 eq) in toluene (5 ml) at 0° C. After stirring overnight at 80° C., the clear solution was dried invacuo, giving a quantitative yield (1.35 g) of intermediate compound (BDI-2)ZnEt. $^1$H NMR (C6D6, 300 MHz) δ7.04 (6H, b, ArH), 4.92 (1H, s, β-CH), 2.60 (4H, m, J=7.5 Hz, $CH_2CH_3$), 2.45 (4H, m, J=7.5 Hz, $CH_2CH_3$), 1.62 (6H, s, α-Me), 1.16 (12H, t, J=7.5 Hz, $CH_2CH_3$), 0.95 (3H, t, J=8.0 Hz, $CH_2CH_3$), 0.25 (2H, q, J=8.0 Hz, $CH_2CH_3$). To a solution of the intermediate compound (BDI) ZnEt-2 (1.35 g, 2.97 mmol, 1 eq) in toluene (10 ml) was added methanol (0.13 ml, 3.20 mmol, 1.1 eq)at room temperature (RT). After stirring for an hour at RT, the clear solution was dried in vacuo and then recrystallized from a minimum amount of toluene at −30° C. (0.98 g, 72%) to produce compound of formula (VIII), i.e., Catalyst D. $^1$H NMR(C6D6, 300 MHz) δ7.09 (6H, m, ArH), 4.64 (1H, s, β-CH), 3.53 (3H, s, OCH$_3$) 2.55 (4H, m, J=7.5 Hz, CH$_2$CH$_3$), 2.20 (4H, m, J=7.5 Hz, CH$_2$CH$_3$), 1.41 (6H, s, α-Me), 1.13 (12H t, J=7.5 Hz, CH2CH$_3$). Analysis of the compound by X-ray crystallography revealed that the compound exists as the dimer in the solid state.

EXAMPLE V

Catalyst E

To a solution of diethyl zinc (0.59 ml, 5.76 mmol, 5 eq) in toluene (5 ml) was slowly added β-diimine formed from 2,4-pentane dione and two equivalents of 2-isopropyl-6-methyl aniline as described in Feldman (H(BDI)-3) (0.415 g, 1.14 mmol, 1 eq) in toluene (5 ml) at 0° C. After stirring overnight at 80° C., the clear solution was dried in vacuo, giving a quantitative yield(0.522 g) of the desired intermediate compound, designated (BDI-3)ZnEt. To a solution of (BDI) ZnEt-3 (0.522 g, 1.14 mmol, 1 eq) in toluene(10 ml) was added methanol (0.047 ml, 1.16 mmol, 1 eq) at room temperature (RT). After stirring for an hour at RT, the clear solution was dried in vacuo and then recrystallized from a minimum amount of toluene at −30° C.(0.254 g, 49%) to provide compound constituting Catalyst E. Analysis of the compound by X-ray crystallography revealed that the compound exists as the dimer in the solid state.

EXAMPLE VI

Catalyst F

To a solution of diethyl zinc (0.56 ml, 5.46 mmol, 5 eq) in toluene (5 ml) was slowly added β-diimine formed from 2,4-pentane dione and two equivalents of 2-ethyl-6-isopropyl anline as described in Feldman (H(BDI)-4) (0.426 g, 1.09 mmol, 1 eq) in toluene (5 ml) at 0° C. After stirring overnight at 80° C., the clear solution was dried in vacuo, giving a quantitative yield (0.528 g) of the desired intermediate compound, designated (BDI-4) ZnEt. To a solution of (BDI)ZnEt-4 (0.528 g, 1.09 mmol) in toluene(10 ml) was added methanol (0.15 ml, 3.386 mmol, 3.4 eq) at room temperature (RT). After stirring for an hour at RT, the suspension was filtered over a frit and the clear solution was dried in vacuo and then recrystallized from a minimum amount of toluene at −30° C. to provide compound constituting Catalyst F (0.201 g, 38%). Analysis of the compound by X-ray crystallography revealed that the compound exists as the dimer in the solid state.

EXAMPLE VII

Catalyst G

To a solution of diethyl zinc (0.64 ml, 6.25 mmol, 5 eq) in toluene (5 ml) was slowly added β-diimine formed from 2,4-pentane dione and two equivalents of 2,6-diethyl-3-chloro aniline as described in Feldman (H(BDI)-5) (0.537 g, 1.24 mmol, 1 eq) in toluene (5 ml) at 0° C. After stirring overnight at 80° C., the clear solution was dried in vacuo, giving a quantitative yield (0.652 g) of the desired intermediate compound, designated (BDI-5)ZnEt. To a solution of (BDI)ZnEt-5 (0.652 g, 1.24 mmol, 1 eq) in toluene (30 ml) was added methanol (0.25 ml, 6.15 mmol, 5 eq) at room temperature (RT). After stirring for 5 min at RT, the clear solution was dried in vacuo. The crude material was dissolved in hexanes (20 ml); the insoluble precipitate was filtered over a frit. The clear solution was concentrated and then recrystallized at 5° C. to provide compound constituting Catalyst G. Analysis of the compound by X-ray crystallography revealed that the compound exists as the dimer in the solid state.

EXAMPLE VIII

Catalyst H

To a solution of diethyl zinc (0.53 ml, 5.17 mmol, 5 eq) in toluene (5 ml) was slowly added β-diimine (H(BDI)-6) (0.401 g, 1.04 mmol, 1 eq) in toluene (5 ml) at 0° C. where the H(BDI)-6 was prepared by reacting H(BDI)-2 with one equivalent of n-butyllithium at −78° C. in THF followed by stirring with one equivalent of p-toluenesulfonyl cyanide at −78° C. for two hours, then warming to room temperature, removing solvent in vacuo, and isolating the product by extracting the solid residue with methylene chloride, washing with water and drying in vacuo. After stirring overnight at 80° C., the clear solution was dried in vacuo, giving a quantitative yield (0.498 g) of the desired intermediate compound, designated (BDI-6)ZnEt. To a solution of(BDI) ZnEt-6 (0.498 g, 1.04 mmol, 1 eq) in methylene chloride (30 ml) was added methanol (0.015 ml, 1.23 mmol, 1.2 eq) at room temperature (RT). After stirring for 4 hours at RT, the clear solution was dried in vacuo ($^1$H NMR showed only 50% conversion). Then extra methanol (0.031 ml, 0.763 mmol, 0.73 eq) was added at RT. After stirring for 2 hours at RT, the clear solution was dried invacuo ($^1$H NMR showed 100% conversion) and then recrystallized from a minimum amount of methylene chloride at −30° C. to provide compound constituting Catalyst H. (0.297 g, 60%). Analysis of the compound by X-ray crystallography revealed that the compound exists as the dimer in the solid state.

SUMMARY OF EXAMPLES I–VIII

A summary of Examples I–VIII is provided in Table 1 below wherein Me is methyl, iPr is isopropyl and Et is ethyl.

TABLE 1

| Example Number | Catalyst | Associated Formula | $R_4$ | $R_5$ | $R_6$ | $R_7$ | $R_8$ | $R_9$ |
|---|---|---|---|---|---|---|---|---|
| I | A | V | Me | H | iPr | iPr | H | H |
| II | B | V | Me | H | Et | Et | H | H |
| III | C | VII | Me | H | iPr | iPr | H | H |
| IV | D | VII | Me | H | Et | Et | H | H |
| V | E | VII | Me | H | iPr | Me | H | H |
| VI | F | VII | Me | H | iPr | Et | H | H |
| VII | G | VII | Me | H | Et | Et | Cl | H |
| VIII | H | VII | Me | CN | Et | Et | H | H |

EXAMPLE IX

In a drybox, Catalyst A produced as in Example I (20 mg, $3.7 \times 10^{-5}$ mol) and cyclohexene oxide (CHO, 3.8 ml, 3.7 g, $3.7 \times 10^{-2}$ mol) and a magnetic stir bar were placed in a 60 ml Fischer-Porter bottle. The vessel was pressurized to 100 psig with $CO_2$ and allowed to stir at 50° C. for 2 h. After a small sample of the crude material was removed for characterization, the product was dissolved in 5 ml of methylene chloride and precipitated from 20 ml of methanol. The product was then dried in vacuo to constant weight (2.56 g, 494 moles of CHO consumed per mole of zinc, 247 moles of CHO consumed per mole of zinc per hour). The polymer contained 96% carbonate linkages (determined by $^1$H NMR spectroscopy). Characterization of the product by gel-permeation chromatography revealed a $M_n$ of 31,000 g/mole, and a $M_w/M_n$ of 1.11.

EXAMPLE X

In a drybox, Catalyst B produced as in Example II (18.4 mg, 0.0189 mmol) and cyclohexene oxide (CHO, 3.9 ml, 3.7 g, $3.8 \times 10^{-2}$ mol) and a magnetic stir bar were placed in a 60 ml Fischer-Porter bottle. The vessel was pressurized to 100 psig with $CO_2$ and allowed to stir at 50° C. for 2 hours. The crude product was dried in vacuo, then was dissolved in a minimum amount (5 ml) of methylene chloride and precipitated from 20 ml of methanol. The product was then dried in vacuo to constant weight (470 moles of CHO consumed per mole of zinc, 235 moles of CHO consumed per mole of zinc per hour). The polymer contained 96% carbonate linkages (determined by $^1$H NMR spectroscopy). Characterization of the product by gel-permeation chromatography revealed a $M_n$ of 22,000 g/mol and a $M_w/M_n$ of 1.12.

EXAMPLE XI

In a drybox, Catalyst C produced as in Example III (25 mg, $4.4 \times 10^{-5}$ mol) and cyclohexene oxide (CHO, 4.5 ml, 4.4 g, $4.4 \times 10^{-2}$ mol) and a magnetic stir bar were placed in a 60 ml Fischer-Porter bottle. The vessel was pressurized to 100 psig with $CO_2$ and allowed to stir at 50° C. for 2 h. After a small sample of the crude material was removed for characterization, the product was dissolved in 5 ml of methylene chloride and precipitated from 20 ml of methanol. The product was then dried in vacuo to constant weight (2.76 g, 449 moles of CHO consumed per mole of zinc, 224 moles of CHO consumed per mole of zinc per hour). The polymer contained 95% carbonate linkages (determined by $^1$H NMR spectroscopy). Characterization of the product by gel-permeation chromatography revealed a $M_n$ of 19,100 g/mole, and a $M_w/M_n$ of 1.07.

EXAMPLE XII

In a drybox, Catalyst D produced as in Example IV (18.4 mg, 0.0201 mmol) and cyclohexene oxide (CHO, 4.1 ml, 3.9 g, $4.0 \times 10^{-2}$ mol) and a magnetic stir bar were placed in a 60 ml Fischer-Porter bottle. The vessel was pressurized to 100 psig with $CO_2$ and allowed to stir at 50° C. for 2 hours. The crude product was dried in vacuo, then was dissolved in a minimum amount (5 ml) of methylene chloride and precipitated from 20 ml of methanol. The product was then dried in vacuo to constant weight (477 moles of CHO consumed per mole of zinc, 239 moles of CHO consumed per mole of zinc per hour). The polymer contained 96% carbonate linkages (determined by $^1$H NMR spectroscopy). Characterization of the product by gel-permeation chromatography revealed a $M_n$ of 23,700 grams/mole, and a $M_w/M_n$ of 1.14.

EXAMPLE XIII

In a drybox, Catalyst E produced as in Example V (18.8 mg, 0.0205 mmol) and cyclohexene oxide (CHO, 6.4 ml, 6.1 g, $6.2 \times 10^{-2}$ mol) and a magnetic stir bar were placed in a 60 ml Fischer-Porter bottle. The vessel was pressurized to 100 psig with $CO_2$ and allowed to stir at 50° C. for 2 hours. The crude product was dried in vacuo, then was dissolved in a minimum amount (5 ml) of methylene chloride and precipitated from 20 ml of methanol. The product was then dried in vacuo to constant weight (418 moles of CHO consumed per mole of zinc, 209 moles of CHO consumed per mole of zinc per hour). The polymer contained 94% carbonate linkages (determined by $^1$H NMR spectroscopy). Characterization of the product by gel-permeation chromatography revealed a $M_n$ of 17,000 grams/mole, and a $M_w/M_n$ of 1.21.

EXAMPLE XIV

In a drybox, Catalyst F produced as in Example VI (12.5 mg, 0.0129 mmol) and cyclohexene oxide (CHO, 4.0 ml, 3.8 g, $3.8 \times 10^{-2}$ mol) and a magnetic stir bar were placed in a 60 ml Fischer-Porter bottle. The vessel was pressurized to 100 psig with $CO_2$ and allowed to stir at 50° C. for 2 hours. The crude product was dried in vacuo, then was dissolved in a minimum amount (5 ml) of methylene chloride and precipitated from 20 ml of methanol. The product was then dried in vacuo to constant weight (622 moles of CHO consumed per mole of zinc, 311 moles of CHO consumed per mole of zinc per hour). The polymer contained 99% carbonate linkages (determined by $^1$H NMR spectroscopy). Characterization of the product by gel-permeation chromatography revealed a $M_n$ of 25,400 grams/mole, and a $M_w/M_n$ of 1.22.

EXAMPLE XV

In a drybox, Catalyst G produced as in Example VII (12.5 mg, 0.0119 mmol) and cyclohexene oxide (CHO, 3.7 ml, 3.5 g, $3.6 \times 10^{-2}$ mol) and a magnetic stir bar were placed in a 60 ml Fischer-Porter bottle. The vessel was pressurized to 100 psig with $CO_2$ and allowed to stir at 50° C. for 2 hours. The crude product was dried in vacuo, then was dissolved in a minimum amount (5 ml) of methylene chloride and precipitated from 20 ml of methanol. The product was then dried in vacuo to constant weight (744 moles of CHO consumed per mole of zinc, 372 moles of CHO consumed per mole of zinc per hour). The polymer contained 97% carbonate linkages (determined by $^1$H NMR spectroscopy). Characterization of the product by gel-permeation chromatography revealed a $M_n$ of 22,900 grams per mole, and a $M_w/M_n$ of 1.11.

EXAMPLE XVI

In a drybox, Catalyst H produced as in Example VIII (10.0 mg, 0.0104 mmol) and cyclohexene oxide (CHO, 6.4 ml, 6.1 g, $6.2 \times 10^{-2}$ mol) and a magnetic stir bar were placed in a 60 ml Fischer-Porter bottle. The vessel was pressurized to 100 psig with $CO_2$ and allowed to stir at 50° C. for 2 hours. The crude product was dried in vacuo, then was dissolved in a minimum amount (5 ml) of methylene chloride and precipitated from 20 ml of methanol. The product was then dried in vacuo to constant weight (1116 moles of CHO consumed per mole of zinc, 558 moles of CHO consumed per mole of zinc per hour). The polymer contained 89% carbonate linkages (determined by $^1$H NMR spectroscopy). Characterization of the product by gel-permeation chromatography revealed a $M_n$ of 31,300 grams per mole, and a $M_w/M_n$ of 1.20.

SUMMARY OF EXAMPLES IX–XVI

A summary of Examples IX–XVI is provided in Table 2 below wherein GPC stands for gel-permeation chromatography.

TABLE 2

| Example | Catalyst | Temp (° C.) | Pressure (psig) | Reaction length (h) | % carbonate linkages | $M_n$ (× $10^{-3}$) (GPC | $M_w/M_n$ (GPC) | TON | TOF ($h^{-1}$) |
|---|---|---|---|---|---|---|---|---|---|
| IX | A | 50 | 100 | 2 | 96 | 31.0 | 1.11 | 494 | 247 |
| X | B | 50 | 100 | 2 | 96 | 22.0 | 1.12 | 470 | 235 |
| XI | C | 50 | 100 | 2 | 95 | 19.1 | 1.07 | 449 | 224 |

TABLE 2-continued

| Example | Catalyst | Temp (° C.) | Pressure (psig) | Reaction length (h) | % carbonate linkages | $M_n$ (× $10^{-3}$) (GPC) | $M_w/M_n$ (GPC) | TON | TOF ($h^{-1}$) |
|---|---|---|---|---|---|---|---|---|---|
| XII | D | 50 | 100 | 2 | 96 | 23.7 | 1.14 | 477 | 239 |
| XIII | E | 50 | 100 | 2 | 94 | 17.0 | 1.21 | 418 | 209 |
| XIV | F | 50 | 100 | 2 | 99 | 25.4 | 1.22 | 622 | 311 |
| XV | G | 50 | 100 | 2 | 97 | 22.9 | 1.11 | 744 | 372 |
| XVI | H | 50 | 100 | 2 | 89 | 31.3 | 1.20 | 1,116 | 558 |

Variations

Many variations of the above will be obvious to those skilled in the art. Thus, the scope of the invention is defined by the claims.

What is claimed is:

1. Compound having the formula

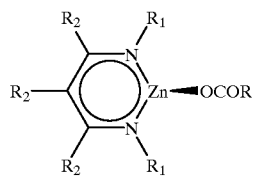

(I)

where each $R_1$ is selected from the group consisting of $C_1$–$C_{20}$ alkyl where one or more hydrogens is optionally replaced by halogen and $C_6$–$C_{20}$ aryl where one or more hydrogens is optionally replaced by halogen and each $R_1$ is the same or different and each $R_2$ is selected from the group consisting of hydrogen, cyano, $C_1$–$C_{20}$ alkyl where one or more hydrogens is optionally replaced by halogen and $C_6$–$C_{20}$ aryl where one or more hydrogens is optionally replaced by halogen and each $R_2$ is the same or different, and R is selected from the group consisting of $C_1$–$C_{20}$ alkyl, $C_6$–$C_{20}$ aryl and polymer of weight average molecular weight up to 1,000,000 having at least one pendant carboxyl group, or dimer thereof, said compound or dimer thereof being effective to catalyze the reaction of epoxide and $CO_2$ to form polycarbonate.

2. Compound is claimed in claim 1 having the formula

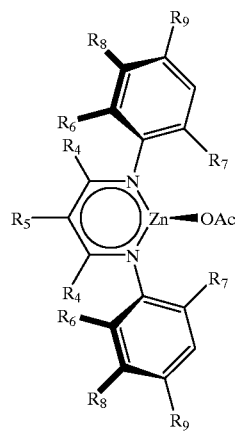

(V)

where $R_4$ is methyl, $R_5$ is hydrogen or cyano, $R_6$ and $R_7$ are the same or different and are $C_1$–$C_3$ alkyl, $R_8$ is hydrogen or chloro, and $R_9$ is hydrogen, or dimer thereof.

3. The compound of claim 2 which is

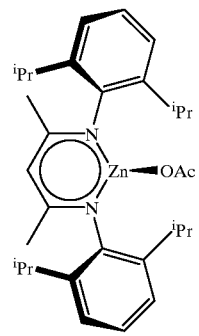

(III)

4. The compound of claim 2 which is

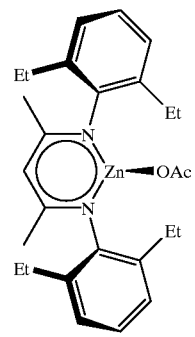

(VI)

5. Compound having the formula

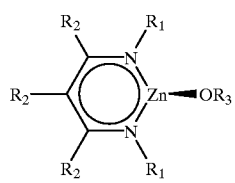

(II)

where each $R_1$ is selected from the group consisting of $C_1$–$C_{20}$ alkyl where one or more hydrogens is optionally replaced by halogen and $C_6$–$C_{20}$ aryl where one or more hydrogens is optionally replaced by halogen and each $R_1$ is the same or different and each $R_2$ is selected from the group consisting of hydrogen, cyano, $C_1$–$C_{20}$ alkyl where one or more hydrogens is optionally replaced by halogen and $C_6$–$C_{20}$ aryl where one or more hydrogens is optionally replaced by halogen and each $R_2$ is the same or different, and $R_3$ is selected from the group consisting of hydrogen, $C_1$–$C_{20}$ alkyl, $C_6$–$C_{20}$ aryl and polymer of weight average molecular weight up to 1,000,000 having at least one pendant hydroxyl group, or dimer thereof, said compound or dimer thereof being effective do catalyze reaction of epoxide and $CO_2$ to for polycarbonate.

6. Compound as claimed claim 5 having the formula

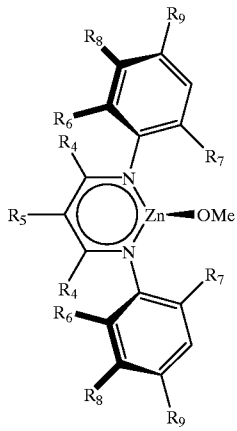

(VII)

where $R_4$ is methyl, $R_5$ is hydrogen or cyano, $R_6$ and $R_7$ are the same or different and are $C_1$–$C_3$ alkyl, $R_8$ is hydrogen or chloro, and $R_9$ is hydrogen, or dimer thereof.

7. The compound of claim 6 having the formula

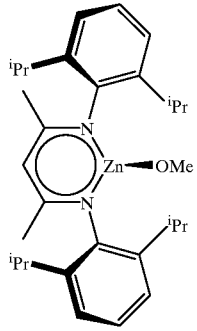

(IV)

8. The compound of claim 6 having the formula

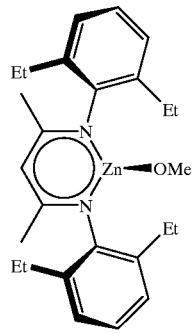

(VIII)

9. The compound of claim 6 having the formula (VII) wherein $R_4$ is methyl, $R_5$ is hydrogen, $R_6$ is isopropyl, $R_7$ is methyl, $R_8$ is hydrogen, and $R_9$ is hydrogen.

10. The compound of claim 6 having the formula (VII) wherein $R_4$ is methyl, $R_5$ is hydrogen, $R_6$ is isopropyl, $R_7$ is ethyl, $R_8$ is hydrogen, and $R_9$ is hydrogen.

11. The compound of claim 6 having the formula (VII) wherein $R_4$ is methyl, $R_5$ is hydrogen, $R_6$ is ethyl, $R_7$ is ethyl, $R_8$ is chloro and $R_9$ is hydrogen.

12. The compound of claim 6 having the formula (VII) wherein $R_4$ is methyl, $R_5$ is cyano, $R_6$ is ethyl, $R_7$ is ethyl, $R_8$ is hydrogen, and $R_9$ is hydrogen.

13. A method for preparing polycarbonate, said method comprising copolymerizing monomers comprising $CO_2$ and epoxide selected from the group consisting of $C_2$–$C_{20}$ alkylene oxides, $C_4$–$C_{12}$ cycloalkene oxides and styrene oxide in the presence of a catalyst which has a Zn center and two ligands where one of the ligands is a propagating group and the other of the ligands is not a propagating group and an activity of at least one TO/hr.

14. The method of claim 13 wherein the catalyst has activity of at least 100 TO/hr.

15. A method for preparing polycarbonate, said method comprising copolymerizing monomers comprising $CO_2$ and epoxide selected from the group consisting of $C_2$–$C_{20}$ alkylene oxides, C4–$C_{12}$ cycloalkene oxides and styrene oxide in the presence of a compound as claimed in claim 1.

16. A method for preparing polycarbonate, said method comprising copolymerizing monomers comprising $CO_2$ and epoxide selected from the group consisting of $C_2$–$C_{20}$ alkylene oxides, $C_4$–$C_{12}$ cycloalkene oxides and styrene oxide in the presence of a compound as claimed in claim 2.

17. A method for preparing polycarbonate, said method comprising copolymerizing monomers comprising $CO_2$ and epoxide selected from the group consisting of $C_2$–$C_{20}$ alkylene oxides, $C_4$–$C_{12}$ cycloalkene oxides and styrene oxide in the presence of a compound as claimed in claim 3.

18. A method for preparing polycarbonate, said method comprising copolymerizing monomers comprising $CO_2$ and epoxide selected from the group consisting of $C_2$–$C_{20}$ alkylene oxides, $C_4$–$C_{12}$ cycloalkene oxides and styrene oxide in the presence of a compound as claimed in claim 4.

19. A method for preparing polycarbonate, said method comprising copolymerizing monomers comprising $CO_2$ and epoxide selected from the group consisting of $C_2$–$C_{20}$ alkylene oxides, $C_4$–$C_{12}$ cycloalkene oxides and styrene oxide in the presence of a compound as claimed in claim 5.

20. A method for preparing polycarbonate, said method comprising copolymerizing monomers comprising $CO_2$ and epoxide selected from the group consisting of $C_2$–$C_{20}$ alkylene oxides, $C_4$–$C_{12}$ cycloalkene oxides and styrene oxide in the presence of a compound as claimed in claim 6.

21. A method for preparing polycarbonate, said method comprising copolymerizing monomers comprising $CO_2$ and epoxide selected from the group consisting of $C_2$–$C_{20}$ alkylene oxides, $C_4$–$C_{12}$ cycloalkene oxides and styrene oxide in the presence of a compound as claimed in claim 7.

22. A method for preparing polycarbonate, said method comprising copolymerizing monomers comprising $CO_2$ and epoxide selected from the group consisting of $C_2$–$C_{20}$ alkylene oxides, $C_4$–$C_{12}$ cycloalkene oxides and styrene oxide in the presence of a compound as claimed in claim 8.

23. A method for preparing polycarbonate, said method comprising copolymerizing monomers comprising $CO_2$ and epoxide selected from the group consisting of $C_2$–$C_{20}$ alkylene oxides, $C_4$–$C_{12}$ cycloalkene oxides and styrene oxide in the presence of a compound as claimed in claim 9.

24. A method for preparing polycarbonate, said method comprising copolymerizing monomers comprising $CO_2$ and epoxide selected from the group consisting of $C_2$–$C_{20}$ alkylene oxides, $C_4$–$C_{12}$ cycloalkene oxides and styrene oxide in the presence of a compound as claimed in claim 10.

25. A method for preparing polycarbonate, said method comprising copolymerizing monomers comprising $CO_2$ and epoxide selected from the group consisting of $C_2$–$C_{20}$ alkylene oxides, $C_4$–$C_{12}$ cycloalkene oxides and styrene oxide in the presence of a compound as claimed in claim 11.

26. A method for preparing polycarbonate, said method comprising copolymerizing monomers comprising $CO_2$ and epoxide selected from the group consisting of $C_2$–$C_{20}$ alkylene oxides, $C_4$–$C_{12}$ cycloalkene oxides and styrene oxide in the presence of a compound as claimed in claim 12.

27. Polycarbonate having a $M_n$ ranging from about 5,000 to about 40,000 and a molecular weight distribution ranging from 1.05 to 2.0, the $M_n$ and the molecular weight distribution being determined by gel permeation chromatography.

28. The polycarbonate of claim 27 which is selected from the group consisting of poly($C_2$–$C_{20}$ alkylene carbonates) and poly($C_4$–$C_{12}$ cycloalkenylene carbonates).

29. The polycarbonate of claim 28, wherein the molecular weight distribution ranges from 1.05 to 1.25.

30. The polycarbonate of claim 29 which contains at least 85% polycarbonate linkages.

31. The polycarbonate of claim 30 which is poly(cyclohexenylene carbonate).

32. The polycarbonate of claim 31 wherein the $M_n$ ranges from 17,000 to 31,000.

* * * * *

UNITED STATES PATENT AND TRADEMARK OFFICE
CERTIFICATE OF CORRECTION

PATENT NO. : 6,133,402
DATED : October 17, 2000
INVENTOR(S) : Geoffrey W. Coates and Ming Cheng It is certified that error appears in the above-identified patent and that said Letters Patent is hereby corrected as shown below:

Claim 5 (column 17, line 5), change "do" to --to--.

Claim 5 (column 17, line 6), change "for" to --form--.

Signed and Sealed this

Twenty-fourth Day of April, 2001

*Attest:*

NICHOLAS P. GODICI

*Attesting Officer*   Acting Director of the United States Patent and Trademark Office